United States Patent Office 3,215,640
Patented Nov. 2, 1965

3,215,640
HYDROGENATION PROCESS
Robert Chalmers Pitkethly and Peter Desmond Holmes, Sunbury-on-Thames, England, assignors to The British Petroleum Company Limited, London, England, a British joint-stock corporation
No Drawing. Filed July 27, 1962, Ser. No. 213,053
Claims priority, application Great Britain, Sept. 7, 1961, 32,142/61
4 Claims. (Cl. 252—466)

This invention relates to a process for the production of a catalyst and to a process of hydrogenation using a catalyst so produced.

It is an object of this invention to provide an improved catalyst suitable for use in effecting hydrocarbon conversion reactions, in particular hydrogenation reactions. It is a further object to provide a hydrogenation process using said catalyst. It is a further object to provide a process of selective hydrogenation using said catalyst. Other objects will appear hereinafter.

According to one aspect of the present invention there is provided a process for the production of a catalyst which comprises treating a catalytic material, comprising elemental nickel on a catalyst support, with (a) elemental sulphur or (b) an organic sulphur compound or (c) $H_2S$ or (d) $CS_2$ or (e) a mixture of two or more components, selected from (a), (b), (c) and (d), said treatment being carried out under conditions such that a minor proportion of the nickel present in the catalytic material is thereby combined with sulphur.

In general, when a supported element nickel catalyst is treated with a sulphur-containing compound at elevated temperature, the extent of sulphiding is progressive as long as sulphur-containing compounds continue to pass over the catalyst and ultimately there is obtained a very highly sulphided catalyst.

We have found that certain classes of sulphur-containing compounds as hereinafter described are only effective for a more limited degree of sulphiding; thus after a certain degree of sulphiding is reached, the use of further quantities of these sulphur-containing compounds, when used under the same conditions as before, does not substantially change the degree of sulphiding. In some cases the degree of sulphiding may be substantially independent of the sulphiding conditions and thus the degree of sulphiding will be determined by the selection of the sulphur-containing compound.

Sulphiding conditions which may be varied include temperature, pressure and flow rate. Usually the sulphiding agent will be used in the vapour phase.

By the use of an organic sulphur compound which is only capable of effecting a limited degree of sulphiding it is possible to obtain a catalyst which has been uniformly sulphided on the surface of the catalyst. Thus while it would be possible to use, for sulphiding, a calculated quantity of an organic sulphur compound which does not possess this property, the resulting catalyst will be sulphided to an undesirably high degree when the catalyst surface is readily accessible to the organic sulphur compound; while it is possible to achieve an average degree of sulphiding equal to a required value, the catalyst will be in part, over-active and, in part under active.

For the purpose of the present specification we classify sulphur-containing compounds as follows:

Class A.—Thiophenes, thiacycloalkanes having at least 4 carbon atoms in the ring; and dialkyl-monosulphides.

Class B.—Sulphur containing organic compounds not included in Class A (for example mercaptans, thiacyclobutane, dialkyl disulphides, elemental sulphur, hydrogen sulphide and carbon disulphide).

Compounds of Class A effect only a limited degree of sulphiding, as described hereinbefore, and these compounds are preferred for use in modifying the catalytic material used in accordance with the present invention.

The preparation of the catalyst and its activation may be carried out in any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules or pellets of any desired size formed from ground support material. After impregnation, the catalyst is dried and is then in a form in which it can be stored for long periods without deterioration. In order to use the catalyst, it must be activated by heating to decompose the salt; in the case of the nitrate this requires a temperature of about 500–550° C., and the nickel will be converted to the oxide. Final activation by reduction to metallic nickel can be carried out in a stream of hydrogen or hydrogen containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results to the sepiolite however, if it is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidising atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves the ammonia. This complex breaks down on heating to give nickel formate again. By using this water-soluble complex, catalysts may be prepared by the impregnation technique from normally water insoluble compounds such as nickel formate. The compound is dissolved in ammonia solution and the solution used for the impregnation of granules or pellets of the support material; the catalyst is then dried, and activation is carried out by the method described under (b).

After the reduction, the nickel catalyst should not be allowed to come into contact with air or spontaneous oxidation of the nickel to nickel oxide may occur.

Preferably the activated catalyst contains 2 to 20% by wt. of elemental nickel, based on the total weight of catalyst.

Suitable catalysts for treatment with a sulphur-containing material and use in the process of the invention are nickel supported on alumina, kieselguhr, chalk and silica gel.

A preferred catalyst is nickel-on-sepiolite.

Sepiolite is a commercially available clay mineral, which occurs naturally and which can also be prepared synthetically. It has the ideal formula

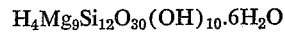
$H_4Mg_9Si_{12}O_{30}(OH)_{10} \cdot 6H_2O$ and is also known as Meerschaum. Further information on sepiolite and its properties may be found in "Chemistry and Industry," of November 16, 1957, at pages 1492 and 1495.

Sepiolite possesses an advantage over some other bases, for example, alumina, in that there is no reaction of the nickel salt with sepiolite during the heating of the catalyst to convert the nickel salt to oxide, and the final reduction can be carried out at a lower temperature than that necessary for nickel-alumina catalysts.

A preferred class of organic sulfur compounds for use in the production of the catalyst consists of the thiophenes, and, in particular $C_4H_4S$. As stated hereinbefore, it has been found that these compounds are capable of sulphiding the nickel catalyst to a satisfactory extent, that is without excessive sulphide formation, even when used in excess of the amount required to provide the required amount of sulphur. Preferred thiophenes have 4 to 10 carbon atoms/molecule. Suitably there is used, for modifying the catalyst, a gasoline containing sulphur predominantly or entirely present as thiophenes. A preferred gasoline is a steam cracked gasoline produced by cracking, in the presence of steam, petroleum distillate fractions, for example, primary flash distillation or naphtha fractions preferably boiling within the range 50° C. to 250° C. Preferred cracking temperature for the production of gasolines for use in the process of the invention exceed 1100° F. (593° C.); suitable temperatures lie in the range 1100° F. to 1400° F. (593–760° C.) and suitable cracking pressures lie in the range 0 to 60 lbs./sq. in. gauge. Preferably the gasolines have a total sulphur content of 0.005 to 0.2% by weight.

Another class of organic sulphur compound which may be employed consists of the mercaptans. However in general when using elemental sulphur, $H_2S$, $CS_2$ or organic sulphur compounds other than compounds of class A, the use of an excess of these materials, over the amount containing the amount of sulphur required for reaction with a minor proportion of the nickel, will lead to excessive sulphiding of the catalyst; when using these materials they will usually be employed in slightly more than the stoichiometric quantities required for the sulphiding of the required proportion of the elemental nickel present in the catalyst.

Usually the treatment of the catalyst to cause sulphiding will be carried out at a temperature from 0–200° C. and at any convenient pressure, being sub-atmospheric, atmospheric or super-atmospheric.

If desired, the treatment of the catalyst may be carried out in the presence of hydrogen.

Usually the amount of the sulphur-containing material which is reacted with the catalyst will be such that the catalyst contains 1 to 40 mol percent of sulphur, based on the elemental nickel content of the unreacted catalyst.

In accordance with another aspect of this invention there is provided a process which comprises hydrogenating a carbon-containing compound over a support catalyst containing nickel which, under the operating conditions, is present in major proportion as elemental nickel, said catalyst having been prepared by treating a catalytic material, comprising elemental nickel on a catalyst support with (a) elemental sulphur or (b) an organic sulphur compound or (c) $H_2S$ or (d) $CS_2$ or (e) a mixture of two or more components, selected from (a), (b), (c) and (d), said treatment being carried out under conditions such that a minor proportion of the nickel present in the catalytic material is thereby combined with sulphur.

Hydrogenation in accordance with the present invention may be carried out using as feedstock any compound containing carbon which is capable of hydrogenation. Thus the compound may be carbon monoxide, an unsaturated hydrocarbon, for example, an olefin, or a compound containing carbon, hydrogen and oxygen, for example, an aldehyde or ketone. The reaction may be continuous or batchwise.

The olefin may be a mono-olefin, di-olefin, or other poly-olefin; however, the preferred feedstocks are mono-olefins. Preferably the olefin has 4–6 carbon atoms/molecule.

The process of this invention is particularly suitable for the conversion of a feedstock which is free of sulphur or sulphur compounds.

Preferably hydrogenation is carried out at a temperature in the range 50–250° C. at any pressure being sub-atmospheric, atmospheric or super-atmospheric. Usually it will be desirable to maintain liquid phase conditions and the pressure will be selected accordingly.

If desired hydrogenation may be carried out using a gas consisting of hydrogen together with inert constituents. Preferably, when inert constituents are present, the gas contains at least 25 mol percent of hydrogen, the proportion suitably lying within the range 25–90 mol percent of hydrogen.

A preferred gas is a platformer tail gas. Suitably a gas is employed containing 70 mol percent of hydrogen. A typical gas will consist of 70 mol percent of hydrogen and 30 mol percent of methane. Other suitable gases are steam cracker tail gas, catalytic cracker tail gas and tail gas derived from the dehydrogenation of hydrocarbons.

The modified catalyst according to this invention, when obtained by the use of a class A compound as hereinbefore defined, is particularly suitable for effecting selective hydrogenation of relatively easily hydrogenatable carbon compounds in the presence of relatively less easily hydrogenatable carbon compounds, by the use of hydrogenating conditions of the necessary degree of severity.

Thus the process of the invention may be employed for the selective hydrogenation of a low sulphur or sulphur free steam cracked gasoline for the destruction of gum forming constituents, for example dienes, without substantial conversion of mono-olefins to paraffins. Preferred operating conditions for effecting this hydrogenation stage are described in British patent specification 848,232. A material containing an organic sulphur compound suitable for use in the pre-treatment of the catalyst is a steam cracked gasoline having a sulphur content in the range 0.005 to 0.04% by wt.

Suitably the feedstock to the selective hydrogenation will be a steam cracked gasoine of petroleum origin boiling within the range 15–200° C. and having a sulphur content less than 0.005% by wt., the gasoline having been obtained at a cracking temperature above 1100° F.

The process of the invention may also be employed for the selective hydrogenation of dienes in mixtures of carbon monoxide, hydrogen and dienes, either in the presence or absence of other hydrocarbons. In this case, the feedstock may be passed over the catalyst without the addition of extraneous hydrogen.

The process of the present invention is also particularly suitable for the selective hydrogenation of acetylenes in the presence of mono-olefins.

Preferably the mixture contains a major proportion by weight of hydrocarbons having 5 or less carbon atoms per molecule. More particularly it is preferred that the mixture is substantially free of hydrocarbons having 6 or more carbon atoms. Very suitably the process may be applied to hydrocarbon mixtures in which the olefin is ethylene and in which the acetylene is $C_2H_2$: preferably the ethylene constitutes a high proportion of the mixture, suitably constituting over 95 mol percent of the mixture.

The process may also be used for the selective hydrogenation of dienes in the presence of olefins.

The invention is illustrated but not limited with reference to the following examples.

EXAMPLE 1

A catalytic material consisting of nickel-on-sepiolite was prepared by impregnating granular sepiolite with an ammoniacal solution of nickel formate. After drying, the catalyst contained 9.95 percent weight nickel (based on the material stable at 1020° F.).

Samples of catalyst were activated by heating to 250° C. in a stream of hydrogen (1000 vol./vol./hr.) at atmospheric pressure and maintaining this treatment for 2 hours. The activated catalyst was then cooled in hydrogen to the required temperature.

The following Table 1 shows the effect of pretreatment with various sulphur compounds on the sulphur content of the treated catalyst. The experiments were carried out with 10 ml. of freshly activated catalyst using various concentrations of sulphur compounds in n-heptane solution. The pretreatment was carried out at atmospheric pressure, 100° C., 2 vol./vol./hr. using a hydrogen flow-rate of ca. 500 vol./vol./hr. for a time sufficient for the desulphurisation reaction to reach completion. The table shows the pretreatment conditions and the sulphur content of the catalyst expressed as the sulphur/nickel atomic ratio.

These results show that catalyst pretreated with sulphur compounds of class A are highly selective. Exhaustive treatment with sulphur compounds of class B produce catalysts of low activity.

Catalysts described in Runs 15, 24 and 30 were oversulphided and not suitable for the hydrogenation of isoprene under the hydrogenation conditions employed and these runs are described for purposes of comparison.

EXAMPLE 3

Additional experiments were carried out with 30 ml. samples of the freshly activated catalyst as described in

Table 1

| Run No. | Pretreatment | | S/Ni Atomic Ratio |
|---|---|---|---|
| 4 | 0.1% wt. thiophene | (2½ hr.) | 0.054 |
| 31 | 0.53% wt. thiophene | (1 hr.) | 0.094 |
| 1 | 1% wt. thiophene | (1 hr.) | 0.043 |
| 2 | ----do---- | (1 hr.) | 0.050 |
| 3 | ----do---- | (1 hr.) | 0.047 |
| 10 | 2% wt. thiophene | (45 mins.) | 0.039 |
| 16 | ----do---- | (45 mins.) | 0.065 |
| 26 | 2% wt. thiophene in N₂ carrier | (45 mins.) | 0.078 |
| 12 | 2% wt. thiophene | (3 hr.)¹ | 0.117 |
| 34 | 1% wt. thiacyclopentane in helium carrier | (1 hr.) | 0.077 |
| 36 | 1% wt. thiacyclopentane | (75 mins.) | 0.056 |
| 37 | ----do---- | (75 mins.) | 0.060 |
| 13 | 2% wt. thiacyclopentane | (2 hrs. 15 mins.)¹ | 0.136 |
| 14 | 2% wt. di-n-butyl sulphide | (1½ hr.) | 0.098 |
| 5 | 0.2% wt. tert-butyl mercaptan | (2½ hr.)² | 0.113 |
| 6 | 1% wt. tert-butyl mercaptan | (6½ hr.)² | 0.65 |
| 11 | 2% wt. tert-butyl mercaptan | (3½ hr.)² | 0.350 |
| 7 | 2% wt. sec-butyl mercaptan | (4 hr.)² | 0.320 |
| 8 | 2% wt. n-butyl mercaptan | (2 hr.)² | 0.320 |
| 9 | 2% wt. iso-butyl mercaptan | (2 hr.)² | 0.185 |
| 15 | 2% wt. di-tert-butyldisulphide | (3½ hr.)² | ³0.57 |
| 24 | 2% wt. carbon disulphide | (2 hr.)² | 0.563 |
| 25 | ----do---- | (4½ hr.)² | 0.626 |
| 29 | Blend containing 0.5% tert-butyl mercaptan and 0.5% thiophene. | (2 hr.)² | 0.17 |
| 30 | 0.53% wt. thiophene (1 hr.) followed by 0.50% wt. carbon disulphide (2 hr.).² | | 0.47 |

¹ Pretreatment carried out at 200° C.
² Reaction not carried to completion.
³ After extraction with acetone solvent.

The experiments showed that at a given treatment temperature the sulphur compounds of class A stopped sulphiding the catalyst when it reached a certain level of sulphur content. Sulphur compounds of class B continued to sulphide the catalyst with prolonged treatment.

EXAMPLE 2

Certain of the treated catalysts described in Table 1 were tested for hydrogenation activity and selectivity in a small reactor at atmospheric pressure, 100° C., 2 vol./vol./hr. in the present of hydrogen (ca. 500 vol./vol./hr.) using a blend containing 10 percent volume isoprene in n-heptane. Table 2 shows the composition of the isoprene hydrogenation products.

Example 1 by pretreatment with various sulphur compounds in a 10 percent isoprene/90 percent n-heptane blend at 200 lbs./sq. in. gauge, 100° C., 2 vol./vol./hr. in a continuous flow of hydrogen (0.05–0.10 litres per minute). The treated catalysts were then used to hydrogenate a 10 percent isoprene/90 percent n-heptane blend at 200 lbs./sq. in. gauge various temperatures, 2 vol./vol./hr. in a hydrogen flow-rate of 0.02–0.12 litres per minute. Run duration at each temperature was approximately 1 hour.

Table 3 shows the analysis of the product obtained by hydrogenation after pretreatment with a blend containing 0.01 percent weight thiophene for 44 hours followed by 20 hours with a 0.05 percent weight thiophene solution. The catalyst contained 0.067 atom sulphur per atom nickel.

Table 2

| Run No. | Pretreatment | S/Ni Atomic Ratio | Weight Percent C₅-Products | | |
|---|---|---|---|---|---|
| | | | Unconverted Isoprene | C₅-Mono-Olefins | Iso-pentane |
| 19 | Nil | | 0.2 | Nil | 99.8 |
| 16 | Thiophene | 0.065 | Nil | 99.1 | 0.9 |
| 34 | Thiacyclopentane | 0.077 | Nil | 100 | Nil |
| 29 | Thiophene/tert-butylmercaptan blend. | 0.17 | 6.3 | 92.4 | 1.3 |
| 15 | Di-tert-butyldisulphide | 0.57 | 98 | 2 | Nil |
| 24 | Carbon disulphide | 0.563 | 100 | Nil | Nil |
| 30 | Thiophene followed by carbon disulphide. | 0.47 | 87 | 13 | Nil |

Table 3

| Catalyst Temperature, ° C | 46 | 65 | 85 | 105 | 121 | 134 | 157 |
|---|---|---|---|---|---|---|---|
| Isoprene, percent wt | 24.3 | 8.0 | 1.1 | <0.1 | Nil | Nil | Nil |
| 2-methylbutene-1, percent wt | 9.9 | 12.6 | 9.0 | 11.4 | 10.8 | 9.3 | 11.9 |
| 3-methylbutene-1, percent wt | 1.7 | 1.4 | 1.1 | 0.4 | 0.4 | | |
| 2-methylbutene-2, percent wt | 62.0 | 72.8 | 83.0 | 78.5 | 69.8 | 57.1 | 40.0 |
| Isopentane, percent wt | 2.1 | 5.2 | 5.8 | 9.7 | 19.0 | 33.6 | 48.1 |

The table shows that between ca. 70° C. and 105° C., the catalyst has a high selectivity (>90 percent mono-olefins).

Table 4 shows the analysis of the product obtained by hydrogenation after pretreating a catalyst with a blend containing 0.05 percent weight per volume n-butyl mercaptan for 20 hours.

*Table 4*

| Catalyst Temperature | 100° C. |
|---|---|
| Isoprene, percent wt | 8.6 |
| 2-methylbutene-1, percent wt | 4.8 |
| 2-methylbutene-2, percent wt | 25.2 |
| Isopentane,[1] percent wt | 61.4 |

[1] Including a small amount of 3-methyl-butene-1.

This table shows that the catalyst possessed some selectivity but was over-hydrogenating. The selectivity was further improved by a subsequent treatment with a 0.05 percent weight thiophene blend for 20 hours. This catalyst has a S/Ni atomic ratio of 0.24. The results after the second sulphiding are shown in Table 5.

*Table 5*

| Catalyst Temperature, °C | 119 | 140 | 164 | 182 | 200 |
|---|---|---|---|---|---|
| Isoprene, percent wt | 9.6 | 1.7 | Nil | Nil | Nil |
| 2-methylbutene-1, percent wt | 13.3 | 14.1 | 14.3 | 14.3 | 9.5 |
| 3-methylbutene-1, percent wt | 1.8 | 1.3 | 1.7 | 1.7 | (1) |
| 2-methylbutene-2, percent wt | 75.0 | 81.4 | 78.0 | 69.7 | 43.5 |
| Isopentane, percent wt | 0.3 | 1.5 | 6.0 | 14.3 | 47.0 |

[1] Included in isopentane.

The results show that the subsequent thiophene treatment improved the selectivity. Maximum selectivity for mono-olefin production was obtained with a temperature of ca. 140° C.

Table 6 shows the results of hydrogenating isoprene after pretreatment with a blend containing 0.10 percent weight per volume di-n-butyl sulphide for 35½ hours when the catalyst S/Ni atomic ratio was 0.118.

*Table 6*

| Catalyst Temperature | 100° C. |
|---|---|
| Isoprene, percent wt | 0.2 |
| 3-methylbutene-1, percent wt | 0.7 |
| 2-methylbutene-1, percent wt | 13.1 |
| 2-methylbutene-2, percent wt | 80.8 |
| Isopentane, percent wt | 5.2 |

Table 7 shows the results of pretreatment with a solution containing 0.05 percent weight per volume di-tert-butyl-disulphide for 4½ hours after which time the S/Ni ratio of the catalyst was 0.34.

*Table 7*

| Catalyst Temperature, °C | 55 | 84 | 102 | 121 | 150 |
|---|---|---|---|---|---|
| Isoprene, percent wt | 78.4 | 73.1 | 61.5 | 32.4 | 2.3 |
| 3-methylbutene-1, percent wt | 0.9 | 1.4 | 1.3 | 2.7 | 2.1 |
| 2-methylbutene-1, percent wt | 5.0 | 6.1 | 8.0 | 12.2 | 17.6 |
| 2-methylbutene-2, percent wt | 15.5 | 19.4 | 29.2 | 52.7 | 77.4 |
| Isopentane, percent wt | 0.2 | Nil | Nil | 0.1 | 0.6 |

The catalyst after this treatment was not very active at 100° C. but showed good activity and selectivity at 150° C.

Table 8 shows the effect of pretreating a nickel catalyst with 0.05 percent weight per volume thiacyclohexane for 24 hours.

*Table 8*

| Catalyst Temperature, °C | 58 | 69 | 86 | 102 | 129 |
|---|---|---|---|---|---|
| Isoprene, percent wt | 1.0 | Nil | Nil | Nil | Nil |
| 2-methylbutene-1, percent wt | 18.9 | 12.2 | 6.5 | 3.1 | 0.7 |
| 2-methylbutene-2, percent wt | 75.3 | 80.3 | 65.4 | 31.7 | 7.0 |
| Isopentane,[1] percent wt | 4.8 | 7.5 | 28.1 | 65.2 | 92.3 |

[1] Including a small quantity of 3-methylbutene-1.

Activity and selectivity were high at low temperatures with this pretreatment.

Table 9 shows the results after pretreating with blends containing 0.05 percent weight per volume (31 hours) and 0.10 percent weight per volume (6 hours) of thiacyclobutane. The catalyst had a S/Ni atomic ratio of 0.313.

*Table 9*

| Catalyst Temperature, °C | 101 | 164 |
|---|---|---|
| Isoprene, percent wt | 63.8 | 3.5 |
| 2-methylbutene-1, percent wt | 3.5 | 7.3 |
| 2-methylbutene-2, percent wt | 15.3 | 33.8 |
| Isopentane,[1] percent wt | 17.4 | 55.4 |

[1] Including a small quantity of 3-methylbutene-1.

Selectivity was poor after this pretreatment.

Table 10 shows the results of pretreatment with a blend containing 0.49 percent weight per volume thiophene for 11 hours followed by a blend containing 0.10 percent weight per volume tert-butyl mercaptan for 12 hours. Catalyst S/Ni atomic ratio was then 0.255.

*Table 10*

| Catalyst Temperature | 100° C. |
|---|---|
| Isoprene, percent wt | 6.0 |
| 3-methylbutene-1, percent wt | 1.7 |
| 2-methylbutene-1, percent wt | 14.7 |
| 2-methylbutene-2, percent wt | 77.0 |
| Isopentane, percent wt | 0.6 |

The results show that the catalyst has a lower activity than a catalyst treated only with thiophene.

We claim:
1. A process for the production of a sulphided nickel catalyst material in which an elemental nickel-containing catalytic material is sulphided prior to use of said catalyst material, which comprises: treating a catalytic material comprising elemental nickel on a catalyst support with at least one sulphur-containing compound selected from the group consisting of thiophenes, thiacylcloalkanes having at least four carbon atoms per ring, and dialkylmonosulphides, at a temperature in the range of 0–200° C., said treatment being carried out such that sulphur is combined with the elemental nickel in an amount between 1 and 40 mol percent of sulphur based on the total elemental nickel in said elemental nickel-containing catalytic material prior to said treatment with said at least one sulphur-containing compound.

2. A process as specified in claim 1 wherein the sulphur-containing compound is thiophene ($C_4H_4S$).

3. A process as specified in claim 1, in which the treatment of the catalyst is carried out in the presence of hydrogen.

4. A process as specified in claim 1, in which the elemental nickel is present in said catalytic material in an amount of between 2% and 20% by weight of total catalytic material.

References Cited by the Examiner
UNITED STATES PATENTS

| | | | |
|---|---|---|---|
| 2,379,670 | 7/45 | Welling et al. | 260—677 |
| 2,402,493 | 6/46 | Greensfelder et al. | 260—677 |
| 3,004,914 | 10/61 | White | 208—255 |
| 3,041,385 | 6/62 | Bourne et al. | 260—677 |
| 3,075,024 | 1/63 | Frevel et al. | 260—677 |

ALPHONSO D. SULLIVAN, *Primary Examiner.*

UNITED STATES PATENT OFFICE
CERTIFICATE OF CORRECTION

Patent No. 3,215,640 November 2, 1965

Robert Chalmers Pitkethly et al.

It is hereby certified that error appears in the above numbered patent requiring correction and that the said Letters Patent should read as corrected below.

Column 1, line 32, for "element" read -- elemental --; column 2, line 40, for "the" read -- in --; column 4, line 38, for "gasoine" read -- gasoline --; column 5, line 51, for "present" read -- presence --; column 6, line 1, for "catalyst" read -- catalysts --.

Signed and sealed this 26th day of July 1966.

(SEAL)
Attest:

ERNEST W. SWIDER
Attesting Officer

EDWARD J. BRENNER
Commissioner of Patents